United States Patent
Krausz et al.

(10) Patent No.: US 10,522,962 B2
(45) Date of Patent: Dec. 31, 2019

(54) PULSE LIGHT SOURCE DEVICE AND METHOD FOR CREATING CEP STABLE FS LASER PULSES

(71) Applicants: MAX-PLANCK-GESELLSCHAFT ZUR FÖRDERUNG DER WISSENSCHAFTEN E. V., Munich (DE); LUDWIG-MAXMILLIANS-UNIVERSITÄT MÜNCHEN, Munich (DE)

(72) Inventors: Ferenc Krausz, Garching (DE); Hanieh Fattahi, Munich (DE)

(73) Assignees: MAX-PLANCK-GESELLSCHAFT ZUR FOERDERUNG DER WISSENSCHAFTEN E. V., Munich (DE); LUDWIG-MAXIMILIANS-UNIVERSITAET MUENCHEN, Munich (DE)

( * ) Notice: Subject to any disclaimer, the term of this patent is extended or adjusted under 35 U.S.C. 154(b) by 0 days.

(21) Appl. No.: 16/308,227

(22) PCT Filed: Jun. 10, 2016

(86) PCT No.: PCT/EP2016/000965
§ 371 (c)(1),
(2) Date: Dec. 7, 2018

(87) PCT Pub. No.: WO2017/211374
PCT Pub. Date: Dec. 14, 2017

(65) Prior Publication Data
US 2019/0267767 A1    Aug. 29, 2019

(51) Int. Cl.
*H01S 3/13*    (2006.01)
*H01S 3/00*    (2006.01)
(Continued)

(52) U.S. Cl.
CPC .......... *H01S 3/0057* (2013.01); *H01S 3/0078* (2013.01); *H01S 3/0092* (2013.01);
(Continued)

(58) Field of Classification Search
CPC .... H01S 3/0057; H01S 3/0078; H01S 3/0092; H01S 3/1307; H01S 3/2383; H01S 3/0604; H01S 3/1618; H01S 3/1643; H01S 3/16
See application file for complete search history.

(56) References Cited

U.S. PATENT DOCUMENTS

| | | | | | |
|---|---|---|---|---|---|
| 5,847,863 | A | * | 12/1998 | Galvanauskas | ....... H01S 3/0057 359/341.3 |
| 5,966,390 | A | * | 10/1999 | Stingl | ................... H01S 3/1112 372/103 |

(Continued)

FOREIGN PATENT DOCUMENTS

EP    2924500    9/2015

OTHER PUBLICATIONS

International Search Report for corresponding PCT Application No. PCT/EP2016/000965 dated Feb. 9, 2017.
(Continued)

*Primary Examiner* — Kinam Park
(74) *Attorney, Agent, or Firm* — Caesar Rivise, PC (57) ABSTRACT

A pulse light source device (100) for creating fs output laser pulses (1, 1.1, 1.2, 1.3) having CEP stability comprises a pulse source device (10) creating primary ps laser pulses, a first beam splitting device (13) splitting the primary ps laser pulses to first ps laser pulses (2.1) and second ps laser pulses (2.2), a pulse shortening device (20) creating sub-ps laser pulses (3) by shortening and spectrally broadening the first ps laser pulses (2.1), a primary supercontinuum generation device (30) creating primary fs laser pulses (4), a pulse
(Continued)

stretcher device (40) creating stretched ps laser pulses (5, 5.1) by stretching the primary fs laser pulses (4), a optical parametric chirped-pulse amplification device (51) creating amplified ps laser pulses (6, 6.1) on the basis of the stretched ps laser pulses (5, 5.1) and the second ps laser pulses (2.2); a phase stabilization device (61) creating CEP stable ps laser pulses (7, 7.1) by difference frequency generation of the amplified ps laser pulses (6, 6.1) and reference laser pulses derived from the primary ps laser pulses (2) or the sub-ps laser pulses (3), a pulse compressor device (71) creating compressed fs laser pulses (8, 8.1) by compressing the CEP stable ps laser pulses (7, 7.1) output by the phase stabilization device (61), and a secondary supercontinuum generation device (81) creating fs output laser pulses as the fs output laser pulses (1, 1.1) to be obtained by spectrally broadening the compressed fs laser pulses (8, 8.1). Furthermore, a method of creating fs output laser pulses is described.

23 Claims, 2 Drawing Sheets

(51) Int. Cl.
| | | |
|---|---|---|
| *H01S 3/23* | (2006.01) | |
| *H01S 3/06* | (2006.01) | |
| *H01S 3/16* | (2006.01) | |

(52) U.S. Cl.
CPC ......... *H01S 3/0604* (2013.01); *H01S 3/1307* (2013.01); *H01S 3/2383* (2013.01); *H01S 3/16* (2013.01); *H01S 3/1618* (2013.01); *H01S 3/1643* (2013.01)

(56) References Cited

U.S. PATENT DOCUMENTS

| | | | | |
|---|---|---|---|---|
| 8,488,639 | B1* | 7/2013 | Diels | H01S 3/10092 372/13 |
| 8,599,889 | B2 | 12/2013 | Biegert et al. | |
| 9,244,332 | B1* | 1/2016 | Calendron | G02F 1/39 |
| 9,627,843 | B2* | 4/2017 | Zhang | H01S 3/0813 |
| 2015/0249315 | A1* | 9/2015 | Ueffing | H01S 3/235 359/337 |
| 2017/0261834 | A1* | 9/2017 | Apolonskiy | G02F 1/3534 |

OTHER PUBLICATIONS

Buberl et al., "Self-compressed, spectral broadening of a Yb:YAG thin-disk amplifier", Optics Express, vol. 24, No. 10, May 16, 2016, pp. 10286-10294.
Fattahi et al., "Pump-seed synchronization for MHz repetition rate, high-power optical parametric chirped pulse amplification", Optics Express, vol. 20, No. 9, Apr. 23, 2012 pp. 9833-9840.
Fattahi, Hanieh, "Third Generation Femtosecond Technology." Introduction, 2016.
Fattahi et al., "Third-generation femtosecond technology", Optica, vol. 1, No. 1, Jul. 2014, pp. 45-63.
Fattahi et al., "High-power, 1-ps, all-Yb:YAG thin-disk regenerative amplifier", Optics Letters, vol. 41, No. 6, Mar. 15, 2016, pp. 1126-1129.
Gordon et al., "Scaling of keV HHG photon yield with drive wavelength", Optics Express, vol. 13, No. 8, Apr. 18, 2005, pp. 2941-2947.
Keiber et al., "Electro-optic sampling of near-infrared waveforms", Nature Photonics, vol. 10, Mar. 2016, pp. 159-163.
Krausz et al., "Attosecond physics", Reviews of Modern Physics, vol. 81, Jan.-Mar. 2009, pp. 163-234.
Leone et al., "What will it take to observe processes in 'real time'?", Nature Photonics, vol. 8, Mar. 2014, pp. 162-166.
Manzoni et al., "Coherent synthesis of ultra-broadband optical parametric amplifiers", Optics Letters, vol. 37, No. 11, Jun. 1, 2012, pp. 1880-1882.
Moulet et al., "Coherent kiloelectronvolt x-rays generated by subcycle optical drivers: a feasibility study", Optics Letters, vol. 39, No. 21, Nov. 1, 2014, pp. 6189-6192.
Mucke et al. 10-mJ few-cycle chirped pulse parametric amplification at 1.5 μm, LEOS 2008—21st Annual Meeting of the IEEE Lasers and Electro-Optics Society, Nov. 9-13, 2008, pp. 559-560.
Mucke et al., "Toward Waveform Nonlinear Optics Using Multimillijoule Sub-Cycle Waveform Synthesizers", IEEE Journal of Selected Topics in Quantum Electronics, vol. 21, No. 5, Sep./Oct. 2015.
Popmintchev et al. "Bright Coherent Ultrahigh Harmonics in the keV X-ray Regime from Mid-Infrared Femtosecond Lasers", Science, vol. 336, Jun. 8, 2012, pp. 1287-1291.
Sansone et al., "High-energy attosecond light sources", Nature Photonics, vol. 5, Nov. 2011, pp. 655-663.
Schultze et al., "Multi-μJ, CEP-stabilized, two-cycle pulses from an OPCPA system with up to 500 kHz repetition rate", Optics Express, vol. 18, No. 26, Dec. 20, 2010 pp. 27291-27297.
Schwarz, et al., "Active stabilization for optically synchronized optical parametric chirped pulse amplification", Optics Express, vol. 20, No. 5, Feb. 27, 2012, pp. 5557-5565.
Shorokhov et al., "Perspective: 4D ultrafast electron microscopy—Evolutions and revolutions", Journal of Chemical Physics, 144, (2016) pp. 1-14.
Silva et al., "Multi-octave supercontinuum generation from mid-infrared filamentation in a bulk crystal", Nature Communications, vol. 3, Article No. 807, (2012).
Tavella et al., "Stronger seed for a multiterawatt few-cycle pulse OPCPA", 2007 European Conference on Lasers & Electro-Optics and the International Quantum.
Travers et al., "Ultrafast nonlinear optics in gas-filled hollow-core photonic crystal fibers [Invited]", Journal of the Optical Society of America, vol. 28, No. 12, Dec. 2011, pp. A-11-A26.
Wirth et al., "Synthesized Light Transients", Science, vol. 334, Oct. 14, 2011, pp. 195-200.
Zewail, Ahmed H., "Femtochemistry: Atomic-Scale Dynamics of the Chemical Bond", Journal of Physical Chemistry, vol. 104, pp. 5660-5694 (2000).

* cited by examiner

PULSE LIGHT SOURCE DEVICE AND METHOD FOR CREATING CEP STABLE FS LASER PULSES

CROSS REFERENCE TO RELATED APPLICATIONS

This application is the U.S. National Phase Application of PCT/EP2016/000965, filed Jun. 10, 2016, the contents of which is incorporated herein by reference in its entirety for all purposes.

TECHNICAL FIELD

The invention relates to a pulse light source device and a method for creating femtosecond (fs) output laser pulses having carrier-envelope-phase (CEP) stability. In particular, the invention relates to a CEP-stable fs pulsed light source and an operating method thereof. Applications of the invention are available e. g. in the fields of generating seeding pulses for pulse amplifiers, like OPAs or OPCPAs, generating of ultrashort, high energy pulses for laboratory use in science, such as in attosecond (as) science, generating high harmonic radiation, generating seeding pulses for seeding of optical waveform synthesizers, and/or time-resolved spectroscopy.

TECHNICAL BACKGROUND

For describing the background of the invention, particular reference is made to the following publications:
[1] A. H. Zewail in "J. Phys. Chem." A 104, 5660-5694 (2000);
[2] F. Krausz et al. in "Rev. Mod. Phys." 81, 163-234 (2009);
[3] S. R. Leone et al. in "Nat. Photonics" 8, 162-166 (2014);
[4] G. Sansone et al. in "Nat. Photonics" 5, 655-663 (2011);
[5] D. Shorokhov et al. in "J. Chem. Phys." 144, 080901 (2016);
[6] A. Gordon et al. in "Opt. Express" 13, 2941-2947 (2005);
[7] T. Popmintchev et al. in "Science" 336, 1287-91 (2012);
[8] H. Fattahi et al. in "Optica" 1, 45-63 (2014);
[9] A. Wirth et al. in "Science" 334, 195-200 (2011);
[10] C. Manzoni et al. in "Opt. Lett." 37, 1880-1882 (2012);
[11] A. Moulet et al. in "Opt. Lett. 39, 6189 (2014);
[12] H. Fattahi, Third-Generation Femtosecond Technology, Springer Theses (Springer International Publishing, Cham, 2015);
[13] F. Silva et al. in "Nat. Commun." 3, 8071-8075 (2012);
[14] S. Keiber et al. in "Nat. Photonics" 10, 159 (2016);
[15] H. Fattahi et al. in "Opt. Lett." 41, 1126-1129 (2016);
[16] T. Buberl et al. in "Opt. Express" 24, 10286 (2016);
[17] J. C. Travers et al. in "J. Opt. Soc. Am." B 28, A11 (2011);
[18] O. D. Muecke et al. in "IEEE J. Sel. Top. Quantum Electron. 21, 1-12 (2015);
[19] M. Schultze et al. in "Opt. Express" 18, 27291-97 (2010);
[20] H. Fattahi et al. in "Opt. Express" 20, 9833-40 (2012);
[21] A. Schwarz et al. in "Opt. Express" 20, 5557-5565 (2012);
[22] U.S. Pat. No. 8,599,889 B2; and
[23] U.S. Pat. No. 9,244,332 B1.

Femtosecond laser technology enabled fs time resolved spectroscopy and new branches of science, like femtochemistry [1] or four-dimensional imaging [5]. The availability of 100 eV-attosecond pulses one decade ago [2] pushed the time resolution of pulses, in particular in the XUV and towards the X-ray wavelength range to attosecond and allowed the study of electron's motion in the atomic time scale by means of near-infrared-pump, attosecond-probe spectroscopy [3]. However the limited flux of the attosecond pulses of the current technology makes attosecond-pump, attosecond-probe spectroscopy nearly impossible and calls for sources with higher photon flux [4].

As the high harmonic generation (HHG) used for generating pulses has a cutoff energy, which scales linearly with the peak intensity and quadratically with the wavelength of the driving pulse, two routes can be considered to extend as pulses to the X-ray regime: i) pushing the central wavelength of the deriving laser to longer wavelength in expense of the lower photon flux of the generated harmonics [6, 7] or ii) scaling the peak-power of the driving laser source [8].

Short pulses available from the current laser technology contain more than one optical cycle of the electric field. Multi-cycle pules at high peak intensities tend to pre-ionize the atoms before the arrival of the main peak of the electric field, responsible for the generation of the highest cutoff energy in HHG. This barrier can be overcome by using tailored single-cycle pulses [9] to drive the HHG. A pulse source for pushing the frontiers of attosecond technology should not only fulfill the above criteria, but also be able of delivering laser pulses at tens or hundreds of kHz repetition rates.

Combining the concept of the field synthesize [9, 10] with Yb-doped-pumped optical parametric chirped pulse amplifiers (OPCPA) provides the possibility of generation of tailored sub-cycle light transients at longer wavelength and higher peak and average-power [8]. It is expected that these high-energy light transients may lead to the new generation of as pulses, extending the HHG cutoff energy to keV, X-ray pulses [8, 11] and providing a platform for as X-ray four dimensional imaging.

The architecture of an optical field synthesizer based on Yb:YAG thin-disk lasers is studied theoretically in [8, 12]. The apparatus comprises (i) an Yb:YAG thin-disk regenerative amplifier, followed by (ii) phase-stable multi-octave seed generation, (iii) amplification of three complementary portions of the supercontinuum (SC) in OPCPA channels, and (iv) coherent recombination of the output of these channels.

It is import to seed the OPCPA chains of the optical field synthesizer with a CEP stable supercontinuum, as waveform synthesis enables control over the electric field of femtosecond pulses on a sub-cycle scale. Additionally, the direct generation of the superoctave seed pulses from the OPCPA pump source assures minimum temporal jitter between pump and seed pulses in the amplification chains. However, direct CEP stable SC generation from 1-ps pulses has been challenging so far.

It is generally known that CEP stability can be obtained by active or passive CEP stabilization techniques. Active CEP stabilization uses fast feedback loops controlling the pulse dynamics of a seed pulse source laser oscillator. The active control has disadvantages in terms of complexity, reliability and stability. With passive CEP stabilization, CEP-stable seed-pulses for the signal channel and seed-pulses for the pump pulse channel in OPAs and/or OPCPAs are generated on the basis of the same driving pulses, resulting in advantages in terms of increased reliability.

For example, with the passive CEP stabilization according to [22], three outputs of a sub-ps pump source are used for generating CEP stable broadband pulses by difference frequency generation (DFG) and for seeding the pump line for OPA or OPCPA based amplification. This technique has disadvantages as the pump source is restricted to create short pulses with a duration below 500 fs, so that the bandwidth of the generated pulses is restricted. Furthermore, the central wavelength of the generated short pulses can be only longer than the pump wavelength. The two pulses send to the DFG stage are restricted to short, intense pulses, so that Yb:YAG thin-disk lasers cannot be used as the pump source.

Another passive CEP stabilization is suggested in [23], wherein the CEP stability is not obtained by a DFG stage like in [22], but by a chain of amplification stages driven by an Yb based picosecond (ps) pump source. The amplification stages are driven by narrowband pulses derived from the ps pump source in [23]. As the CEP stable SC generation is based on a CEP-stable idler beam of the amplification stages, the amplification stages have to be used in a collinear geometry to avoid the angular chirp on the idler. This approach limits the achieved CEP-stable pulses to a narrow wavelength range only, so that the technique of [23] can have limitations in terms of restricting the SC generation to the driving with an idler beam having a fixed central wavelength.

Further to the application in optical field synthesizers, a need for a CEP-stable fs pulsed light source exists in other fields, e. g. time-resolved spectroscopy.

Objective of the Invention

The objectives of the invention are to provide an improved pulse light source device and an improved method for creating fs pulses, which are capable of avoiding limitations and disadvantages of conventional techniques, resp. In particular, the device and method are to be capable to provide an extended spectral coverage of fs pulse generation and/or improved flexibility in adjusting the spectral intensity characteristic of the fs pulses.

SUMMARY OF THE INVENTION

The above objectives are solved by a pulse light source device and a method of creating fs output pulses comprising the features of the independent claims, resp. Advantageous embodiments and applications of the invention are defined in the dependent claims.

According to a first general aspect of the invention, a pulse light source device for creating CEP stable fs output pulses comprises a chain of subsequent components, including in this order a ps pulse source device, a pulse shortening (and spectrally broadening) device, a primary supercontinuum generation device, a pulse stretcher device, a first optical parametric chirped-pulse amplification (OPCPA) device, a first phase stabilization device, a first pulse compressor device, and a first secondary supercontinuum generation device. Each of the components is driven on the basis of the output of the directly preceding component, and the first phase stabilization device is arranged for CEP stabilization by DFG on the basis of the output of the pulse source device or the pulse shortening device and the output of the first OPCPA device. Advantageously, by the provision of the pulse shortening device and the DFG based first phase stabilization device, the limitations of the conventional techniques can be met as outlined with further details below.

According to a second general aspect of the invention, a method of creating fs output pulses comprises the steps of splitting primary ps laser pulses to first ps laser pulses and second ps laser pulses, creating first sub-ps laser pulses by shortening and spectrally broadening the first ps laser pulses using an optical nonlinear process, creating primary fs laser pulses by subjecting the first sub-ps laser pulses to a super-continuum generation process, creating stretched ps laser pulses by stretching the primary fs laser pulses, and creating first amplified ps laser pulses on the basis of the stretched ps laser pulses and the second ps laser pulses, creating first CEP stable ps laser pulses (difference frequency pulses) by difference frequency generation of the first amplified ps laser pulses and reference laser pulses derived from the primary ps laser pulses or from the sub-ps laser pulses, creating first compressed fs laser pulses by compressing the first CEP stable ps laser pulses, and creating first fs output laser pulses as the fs output laser pulses to be obtained by spectrally broadening the first compressed fs laser pulses. Preferably, the method of creating the fs output pulses is conducted using the pulse light source device of the above first general aspect of the invention.

Advantageously, the inventive pulse light source device and method provide a universal solution which meets the abovementioned criteria and can serve e. g. as a seed for multi-octave optical field synthesizers or a front end for ps-pumped OPCPAs. With further examples, the generated multi-octave, CEP-stable fs output pulses derived from the first or further secondary supercontinuum generation device(s) provide an ideal source for time-resolved and field-resolved spectroscopy particularly electro-optic-sampling at optical frequencies (as described e. g. in [14]). The inventors have found by thorough comparative experimental studies of several techniques that the new combination of difference-frequency generation (DFG) and self phase-modulation-induced spectral broadening (see e. g. [13] represents the best approach for satisfying the conditions required for the above applications.

In particular, the inventive pulse light source device is configured for a direct generation of a super-octave (spectral range larger than one frequency octave), carrier-envelope-phase (CEP) stable continuum from the output of the ps source device, e. g. an 1-ps, Yb:YAG, thin-disk regenerative amplifier. The intrinsically CEP-stable spectrum spans from 450 nm to beyond 2400 nm containing 4 µJ energy. The invention allows the generation of a CEP-stale pulses with 3.5 PHz spectral bandwidth from a nearly single frequency 2 THz-broad pulses with random phase. The obtained fs output pulses created by the inventive pulse light source device comprise single-cycle or few-cycle pulses, which are scalable in terms of energy and average power. These excellent parameters render the system a unique front end for field synthesizers, optical parametric amplifiers and a versatile tool for time-resolved spectroscopy. The invention is a crucial step towards all-Yb:YAG single-cycle sources with TW-peak power and tens-of-watts average power.

In the following, preferred details of the components of the pulse light source device and the method steps are summarized. It is noted that further details can be included in a practical setup without deviating from the structural and function-related features of the invention. Thus, creating laser pulses, i. e. sequences of pulses, at the specific components of the pulse light source device using the output of the preceding component means that the input to the subsequent component is provided directly by the output of the preceding component or derived from this output while keeping the temporal and spectral features thereof.

The pulse source device includes a ps laser pulse source, e. g. a solid state laser with an ion doped gain material and/or a laser amplifier, and optionally a frequency shifter, e. g. a second harmonic (SHG) unit. The ps laser pulse source is arranged for creating primary ps laser pulses, preferably having a pulse duration in a range from at least 0.7 ps, in particular at least 1 ps, and/or at most 10 ps, in particular at most 5 ps.

The first beam splitting device, e. g. including at least two beam splitters, is arranged for splitting the primary ps laser pulses to first ps laser pulses and second ps laser pulses.

The pulse shortening device, preferably including an optical non-linear crystal, is arranged for creating first sub-ps laser pulses by shortening and spectrally broadening the first ps laser pulses using an optical nonlinear process. According to a preferred embodiment of the invention, the pulse shortening device is arranged for creating the sub-ps laser pulses with a pulse duration which is selected such that a peak power of the sub-ps laser pulses is below a damage threshold of the subsequent primary supercontinuum generation device. Thus, the operational stability of the pulse source device is improved. Particularly preferred, the first sub-ps laser pulses have a pulse duration in a range from at least 15 fs, in particular at least 100 fs, and/or at most 900 fs, in particular at most 700 fs, and they are spectrally broadened compared with the bandwidth of the first ps laser pulses, e.g. from 1 nm of the first ps laser pulses to 3 nm of the first sub-ps laser pulses.

The provision of the pulse shortening device has advantages in terms of optimizing the duration of the pulses driving the subsequent primary supercontinuum generation device and creating new spectral components. With the reduction of the pulse duration compared with the primary ps laser pulses, the primary supercontinuum generation device can be operated with improved stability and reproducibility. With regard to creating new spectral components, the pulse shortening device of the inventive pulse source device represents a new feature compared with the compressors included in the setup of [23]. The conventionally used compressors provided a pulse compression only without a spectral broadening, while the pulse shortening device creates new spectral components contributing to the subsequent SC generation processes, so that the spectral coverage of the CEP stable fs output pulses to be obtained is increased compared with the conventional technique.

According to a further preferred feature of the invention, the pulse shortening device includes a cross-polarized wave generation unit (XPW unit). Advantages of the XPW unit result from several properties of the XPW process: The generated pulses are self-compressed and they possess high temporal and spatial contrast (see e. g. [16]).

The primary supercontinuum generation device is arranged for creating primary fs laser pulses by subjecting the first sub-ps laser pulses to a supercontinuum generation process (white-light generation process, filamentation). Preferably, the primary supercontinuum generation device includes a YAG crystal or a waveguide unit.

The pulse stretcher device is arranged for creating the stretched ps laser pulses by stretching the primary fs laser pulses. Preferably, the pulse stretcher device is arranged for creating the stretched ps laser pulses with a duration matched to the duration of the primary ps laser pulses. Particularly preferred, the stretched ps laser pulses have a duration equal to or slightly shorter, e. g. down to the duration of the sub-ps laser pulses, compared with the duration of the primary ps laser pulses, so that the efficiency of the subsequent amplification and phase stabilization steps is improved.

The first OPCPA device is arranged for creating the first amplified ps laser pulses on the basis of the stretched ps laser pulses and the second ps laser pulses. The stretched ps laser pulses are amplified in an OPCPA unit, using the second ps laser pulses or a frequency shifted version thereof. Depending on the centre wavelengths of the pulses, the stretched ps laser pulses provide seed pulses and the second ps laser pulses (or the frequency shifted version thereof) provide pump pulses for the OPCPA process, or vice versa.

Preferably, the OPCPA device is operated with saturated amplification. Advantageously, this provides not only the pulse energy required for subsequent spectral broadening stage but also eliminates accumulated energy fluctuations from the preceding nonlinear stages.

The first phase stabilization device is arranged for creating the first CEP stable ps laser pulses by difference frequency generation of the first amplified ps laser pulses and reference laser pulses derived from the primary ps laser pulses or from the first sub-ps laser pulses. With regard to providing CEP stability, the first phase stabilization device of the inventive pulse source device represents a new feature compared with the amplification stages included in the setup of [23]. Advantageously, as the first amplified ps laser pulses and the reference laser pulses are derived from the same source, directly from the primary ps laser pulses or via the first sub-ps laser pulses, efficient passive CEP stabilization is obtained. Furthermore, the DFG process introduces more flexibility in generating the first CEP stable ps laser pulses with a certain centre wavelength of interest, and limitation to fixed wavelengths are avoided. This can be done by using optical parametric amplification in the Fourier domain (FOPA) or noncollinear geometry unlike [23] which is limited just to the collinear geometry. Advantageously, the centre wavelength of the pulses input to the DFG process can be freely adjusted by the OPCPA stage without limitation.

According to a preferred embodiment, the reference laser pulses are obtained by splitting third ps laser pulses from the primary ps laser pulses and the first CEP stable ps laser pulses are created by difference frequency generation of the first amplified ps laser pulses and the third ps laser pulses. This embodiment has advantages in terms of the efficiency of the DFG process if ps pulses are used as both inputs. According to an alternative embodiment, the reference laser pulses are obtained by second sub-ps laser pulses split from the first sub-ps laser pulses with a second beam splitting device and the first CEP stable ps laser pulses are created by difference frequency generation of the first amplified ps laser pulses and the second sub-ps laser pulses.

The first pulse compressor device is arranged for creating first compressed fs laser pulses by compressing the first CEP stable ps laser pulses output by the first phase stabilization device. Advantageously, the duration of the first compressed fs laser pulses is selected such that the subsequent secondary supercontinuum generation can be operated with improved stability and reproducibility.

Finally, the first secondary supercontinuum generation device is arranged for creating the first fs output laser pulses as the fs output laser pulses to be obtained by subjecting the first sub-ps laser pulses to a secondary supercontinuum generation spectrally broadening the first compressed fs laser pulses. Preferably, the first secondary supercontinuum generation device includes a YAG crystal or a waveguide unit.

According to a further preferred embodiment of the invention, the pulse light source device further has a third beam splitting device, which is arranged for spectrally selective splitting the stretched ps laser pulses and providing first stretched ps laser pulses with a first spectral intensity characteristic being included in the spectral supercontinuum characteristic of the primary fs laser pulses, wherein the first OPCPA device is arranged for creating the first amplified ps laser pulses by amplifying the first stretched ps laser pulses on the basis of the second ps laser pulses. Advantageously, with the spectrally selective third beam splitting device a spectral selection of a wavelength range from the spectral supercontinuum characteristic of the primary fs laser pulses is obtained and the first OPCPA device can be adapted to an amplification even in this selected wavelength range. The first OPCPA device and the subsequent components provide a first spectral channel of the pulse light source device. Optionally, further parallel spectral channels can be provided, preferably downstream from the third beam splitting device as outlined below.

Preferably, the third beam splitting device includes at least one spectrally selective beam splitter, like e. g. a dichroic mirror or dichroic prism. Alternatively, the third beam splitting device may comprise a combination of another pulse stretcher unit, e. g. extending the pulse duration by a factor in a range of 3 to 10, a delay line and a non-selective beam splitter. Due to the chirp of the stretched ps laser pulses, spectrally selective beam splitting can be obtained by the effect of the delay line setting the arrival time of a certain portion of the stretched ps laser pulses at the subsequent OPCPA device.

According to a particularly preferred embodiment of the invention, the third beam splitting device is arranged for additionally providing at least second stretched ps laser pulses, i. e. second, third or more sequences of stretched ps laser pulses, having a spectral intensity characteristic being included in the spectral supercontinuum characteristic of the primary fs laser pulses and differing from the spectral intensity characteristic of the first stretched ps laser pulses. Each of the second, third or more sequences of stretched ps laser pulses has a different centre wavelength and optionally a different spectral bandwidth. Advantageously, this allows to provide at least one additional parallel spectral channel of amplification, phase stabilization, compression and supercontinuum generation.

To this end, the pulse light source device further includes at least a second and optionally a third or even more OPCPA device(s), each of which being arranged for creating second, third or more sequences of amplified ps laser pulses by amplifying the spectrally selected, second, third or more sequences of stretched ps laser pulses on the basis of the second ps laser pulses. Furthermore, at least a second and optionally a third or even more phase stabilization device(s) is/are arranged for creating second, third or more sequences of CEP stable ps laser pulses by difference frequency generation of the second, third or more sequences of amplified ps laser pulses and the reference laser pulses. Subsequently, a second and optionally a third or more pulse compressor device(s) is/are arranged for creating second, third or more sequences of compressed fs laser pulses by compressing the second, third or more sequences of CEP stable ps laser pulses. Subsequently, a second and optionally a third or more secondary supercontinuum generation device (s) is/are arranged for creating second, third or more sequences of fs output pulses contributing to the fs output laser pulses to be obtained by spectrally broadening the second, third or more sequences of compressed fs laser pulses.

As the main advantage of providing at least one additional spectral channel, the pulse light source device can be optimized as a fs pulse source for an optical field synthesizer. For this application, preferably three parallel spectral channels are provided each with one of the first and at least one second OPCPA devices, one of first and at least one second phase stabilization devices, one of first and at least one second pulse compressor devices and one of first and at least one second secondary supercontinuum generation devices, wherein the third beam splitting device is arranged for spectrally selective splitting the stretched ps laser pulses and providing the first, the second and third stretched ps laser pulses each with a specific spectral intensity characteristic differing from the spectral intensity characteristic of the other stretched ps laser pulses. Preferably, the fs output laser pulses are coherently superimposing (coherently added) for creating an optical synthesized field.

According to a further preferred embodiment of the invention, a frequency shifting device is arranged for creating frequency shifted ps laser pulses from the second ps laser pulses and delivering the frequency shifted ps laser pulses to at least one of the first and at least one second OPCPA devices.

Advantageously, the frequency shifting device provides an adaptation of the spectral intensity characteristic of the frequency shifted ps laser pulses to the spectral intensity characteristic of the stretched ps laser pulses, thus improving the efficiency of the OPCPA process(es).

If the CEP stable fs output pulses output by the secondary supercontinuum generation device(s) are amplified in a further amplification stage, advantages for increasing the output power of the fs output pulses can be obtained.

BRIEF DESCRIPTION OF THE DRAWINGS

Further details and advantages of preferred embodiments of the invention are described in the following with reference to the attached drawings, which show in.

DESCRIPTION OF PREFERRED EMBODIMENTS

Figure 1:
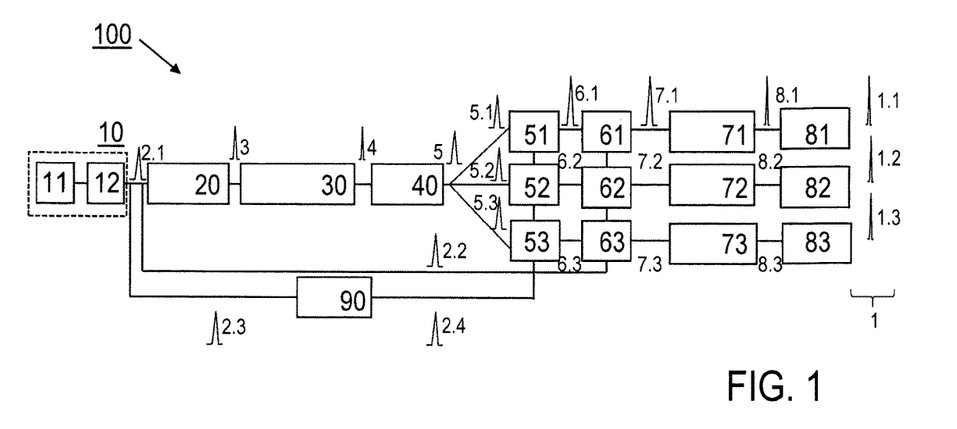
FIG. 1: a schematic illustration of a pulse light source device, including three spectral channels, according to a preferred embodiment of the invention.

Features of preferred embodiments of the invention are described in the following with particular reference to the combination of the components of the pulse source device and the operation thereof. These components, in particular the ps pulse source device, the frequency shifting device, the pulse shortening device, the primary supercontinuum generation device, the pulse stretcher device, the first and optionally further OPCPA device(s), the first and optionally further phase stabilization device(s), the first and optionally further pulse compressor device(s), and the first and optionally further secondary supercontinuum generation device(s) are schematically illustrated in FIG. 1. Details of these components are described in an exemplary manner with reference to FIG. 2, but can be modified as far as they are known as such from conventional light pulse generation, pulse manipulation and light amplification techniques. With a practical implementation of the invention, these components may include further optical components, like e.g. mirrors, refractive optics, reflective optics, polarizers and/or sensors, e. g. as exemplified in FIG. 2.

FIG. 1 schematically illustrates a preferred embodiment of the inventive pulse light source device 100 for creating fs output laser pulses 1 including three sequences of fs pulses 1.1, 1.2 and 1.3 having different spectral intensity characteristics. Depending on the application of the pulse light source device 100, the fs pulses 1.1, 1.2 and 1.3 can be coherently superimposed in a subsequent beam combination step and/or subjected to a further amplification (not shown in FIG. 1, see box 200 in FIG. 2).

The pulse source device 10 comprises a ps laser pulse source 11 creating a ps laser pulse output, e. g. an Yb:YAG lasers in thin-disk, fiber or slab geometry, or cryo-cooled Yb:YAG amplifiers. The source device can also include Hm-doped or Tm-doped amplifiers, combined with a SHG unit 12. The primary ps laser pulses 2 output by the pulse source device 10 have a duration of 1 ps with a repetition rate of 5 kHz, a bandwidth of 1.6 nm and a centre wavelength of 1030 nm. Energy and average power can be selected with e. g. 1.6 mJ.

The primary ps laser pulses 2 are split with the first beam splitting device 13 to first ps laser pulses 2.1, second ps laser pulses 2.2 and third ps laser pulses 2.3. The first ps laser pulses 2.1 are shortened and spectrally broadened with the pulse shortening device 20 creating first sub-ps laser pulses 3 with an optical nonlinear crystal. As an example, the first sub-ps laser pulses 3 have a duration of 650 fs and a bandwidth of 2.72 nm. Optionally, second sub-ps laser pulses can be split with a second beam splitting device (not shown in FIG. 1) from the first sub-ps laser pulses 3 for providing reference pulses for the DFG process in the phase stabilization device(s) 61, 62, 63, as described below with reference to FIG. 2.

The first sub-ps laser pulses 3 are directed to the primary supercontinuum generation device 30 for creating the primary fs laser pulses 4 having a duration of 650 fs, a bandwidth of 700 nm and a centre wavelength of 1030 nm. With the pulse stretcher device 40, including e. g. a dielectric material, like any type of glass or gratings or prism, the primary fs laser pulses 4 are stretched for creating stretched ps laser pulses 5. Advantageously, the stretched ps laser pulses 5 are broadband pulses with the spectral bandwidth of the primary fs laser pulses 4, but with the duration of the primary ps laser pulses 2.

With the third beam splitting device 42, the broadband stretched ps laser pulses 5 are split to three sequences of stretched ps laser pulses 5.1, 5.2, 5.3 having different centre wavelengths of e. g. 700 nm, 900 nm and 1100 nm. Each of the sequences of stretched ps laser pulses 5.1, 5.2, 5.3 is input to one of the three spectral channels for creating the fs pulses 1.1, 1.2 and 1.3.

In the first channel, the first OPCPA device 51 amplifies the stretched ps laser pulses 5.1 using the second ps laser pulses 2.3 or a frequency shifted version 2.4 thereof. The amplification results in first amplified ps laser pulses 6.1 having an energy of e. g. 0.16 mJ.

Subsequently, the passive phase stabilization is introduced with the first phase stabilization device 61. Difference frequency generation of the first amplified ps laser pulses 6.1 and reference laser pulses derived from the third ps laser pulses 2.3 results in the first CEP stable ps laser pulses 7.1. Due to the DFG process, CEP instability of the primary ps laser pulses 2 is eliminated as equal CEP changes of the primary ps laser pulses 2 are included in both of the first amplified ps laser pulses 6.1 and the third ps laser pulses 2.3. The centre wavelength of the first CEP stable ps laser pulses 7.1 is e. g. 2 µm.

The first phase stabilization device 61 is adapted for the DFG of the short centre wavelength of the first stretched ps laser pulses 5.1, and it comprises e. g. a Beta barium borate (BBO) crystal. The second and third phase stabilization devices 62, 63 in the other spectral channels are adapted for the DFG at other wavelengths, and they comprise e. g. BBO or Lanthanum gallium silicate (LGS) crystals. The centre wavelengths of the second and third CEP stable ps laser pulses 7.2, 7.3 is e. g. 5 µm and 10 µm, resp.

With the further steps, the first CEP stable ps laser pulses 7.1 are compressed with the first pulse compressor device 71. The resulting first compressed fs laser 8.1 have a duration of e. g. 32 fs, and they are subjected to filamentation in the first secondary supercontinuum generation device 81, where fs pulses 1.1 with a spectral range of e. g. 400 nm to 3 µm are created. The second and third secondary supercontinuum generation device 82, 83 create fs pulses 1.2 and 1.3 with spectral ranges of e. g. 400 nm to 6 µm and 400 nm to 8 µm, 12 µm or even 15 µm. Advantageously, by coherent addition of the fs pulses 1.1, 1.2 and 1.3, fs output pulses with a spectral ranges from 300 nm up to 15 µm can be obtained.

Figure 2:
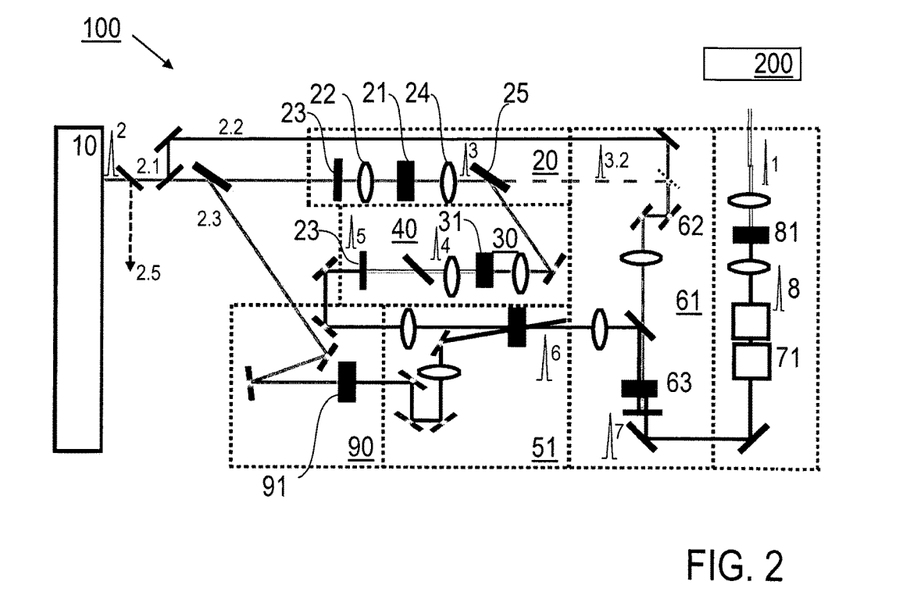
FIG. 2: a schematic illustration of details of a pulse light source device, including one single spectral channels, according to a further preferred embodiment of the invention.

FIG. 2 illustrates further features of alternative embodiments, including one single spectral channel only. Despite of the provision of one single channel, components and pulses are indicated similar to the above components and pulses (e. g. as first amplified ps laser pulses). The details shown in FIG. 2 can be implemented in the setup of FIG. 1 as well.

The pulse light source device 100 for generation of fs output pulses 1 having a super-octave continuum spectral range is shown in FIG. 2. First ps laser pulses 2.1, e. g. 1.6 mJ of the output energy of a 1-ps, Yb:YAG, thin-disk regenerative amplifier 10, e. g. as described in [15], are separated by using the first beam splitter 13, comprising an attenuator with a ½ wave plate 14 and a thin-film polarizer (TFP) 15 and sent to the SC generation setup (20 to 80) while the rest 2.5 of the laser's 10 output optionally can be used to pump further OPCPA chains (not shown in FIG. 2).

Direct filamentation in bulk using 1-ps pulses is challenging, as the material's damage threshold and critical peak power for 1-ps-driven continuum generation are of the same order of magnitude. Therefore the generated filament for pulses longer than several-hundreds of fs would be unstable or not reproducible, e. g. on daily basis. To avoid this problem, the first ps laser pulses 2.1 are shortened to 650 fs pulse duration at full width at half maximum (FWHM) in a cross-polarized wave generation (XPW) stage 21.

An AR-coated convex lens 22 with 75 mm focal length (f) is used to focus 140-mJ, 1-ps pulses into a 4-mm-thick, holographic-cut, BaF2 crystal 21 for XPW generation. The crystal is placed slightly after the focus to balance the beam divergence and self-focusing, allowing to reach higher conversion efficiency (see e. g. [16]). An additional nanoparticle-linear-film polarizer 23 (manufacturer: Thorlabs) can be placed before the convex lens 22 to enhance the polarization contrast of the input beam to the XPW stage 21. An AR-coated convex lens 24 (f=75 mm) is used to collimate the beam and the 650 fs XPW pulses (first sub-ps laser pulses 3), containing 5 mJ of energy were separated from the fundamental beam by using a second beam splitting device 25, e.g. an AR-coated TFP. Optionally, second sub-ps laser pulses 3.2 can be split at second beam splitting device 25 for providing reference pulses for the first phase stabilization device 61 (see dashed line).

Afterwards the shortened first sub-ps laser pulses 3 are focused in the primary supercontinuum generation device 30 to a SC generation crystal 31, e. g. a 4 mm YAG crystal, using a convex lens 32 (f=75 mm), and a stable filament (primary fs laser pulses 4) with the spectrum spanning from 550 nm to 1400 nm is achieved.

Figure 3:
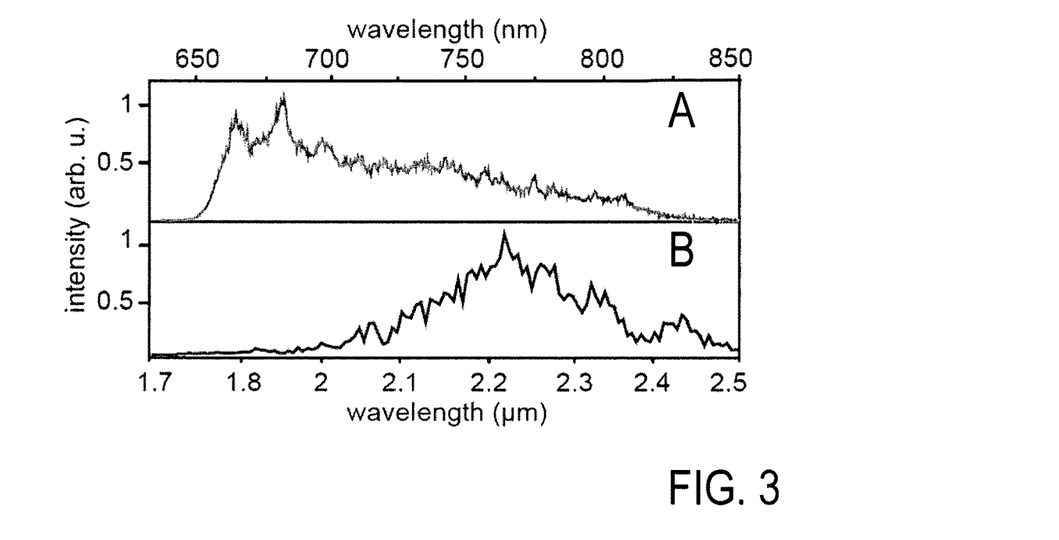
FIGS. 3 and 4: experimental and simulations results obtained with the inventive pulse light source device according to FIG. 2.

The spectral components of the primary fs laser pulses 4 between 600 nm to 750 nm are separated from the rest of the continuum by using a third beam splitting device 42, preferably a dielectric filter, and sent via the pulse stretcher device 40 to the OPCPA device 51 in order to boost their energy to 120 mJ in a 4-mm-thick BBO crystal 52 (phase matching angle ($\theta$)=24.5°, nocollinear angle ($\alpha$)=2.5°). FIG. 3A shows an example of an amplified spectrum of first amplified ps laser pulses 6 created in the OPCPA stage.

The seed pulses input to the OPCPA device 51 were temporally stretched by the pulse stretcher device 40, e. g. a 4 mm SF57 glass plate, prior to the OPCPA device 51 in order to optimize the temporal overlap between the pump and seed pulses. The pump of the OPCPA device 51 is generated by frequency doubling of third ps laser pulses 2.3 (Yb:YAG pulses with 1.4 mJ energy) in the frequency shifting device 90, including e. g. a 1-mm-thick BBO crystal 91 (Type 1, $\theta$=32°), resulting in 860 mJ pulses 2.4 at 515 nm and 60% optical to optical conversion efficiency.

Subsequently, the first amplified ps laser pulses 6 are input to the first phase stabilization device 61 for creating first CEP stable ps laser pulses 7 by difference frequency generation of the first amplified ps laser pulses 6 and reference laser pulses derived from primary ps laser pulses 2.

According to a first alternative, the second ps laser pulses 2.2 split from the primary ps laser pulses of the laser source device 10 are used as reference laser pulses for DFG. The second ps laser pulses 2.2 are sent via a delay line 62 for adjusting the temporal relationship of the first amplified ps laser pulses 6 and the reference laser pulses to the DFG crystal 63. According to a second alternative, the second sub-ps laser pulses 3.2 (unconverted energy of the XPW stage 21) is reused and mixed with the amplified pulses from the OPCPA device 51 at the DFG crystal 63.

The DFG crystal 63 comprises e. g. a 2-mm-thick BBO crystal ($\theta$=20°) in a collinear geometry. This geometry is preferred to avoid angular chirp of the generated first CEP stable ps laser pulses 7. The spectrum of the 4-mJ, intrinsically CEP-stable pulses span from 1600 nm to-2400 nm, as shown in FIG. 3B and is negatively chirped. FIG. 3B illustrates an example of the DFG process between the OPCPA and the regenerative amplifier pulses in a 2-mm-thick BBO crystal, resulting results in a broadband spectrum centered at 2 μm. The generated first CEP stable ps laser pulses 7 are intrinsically CEP-stable.

Figure 4:
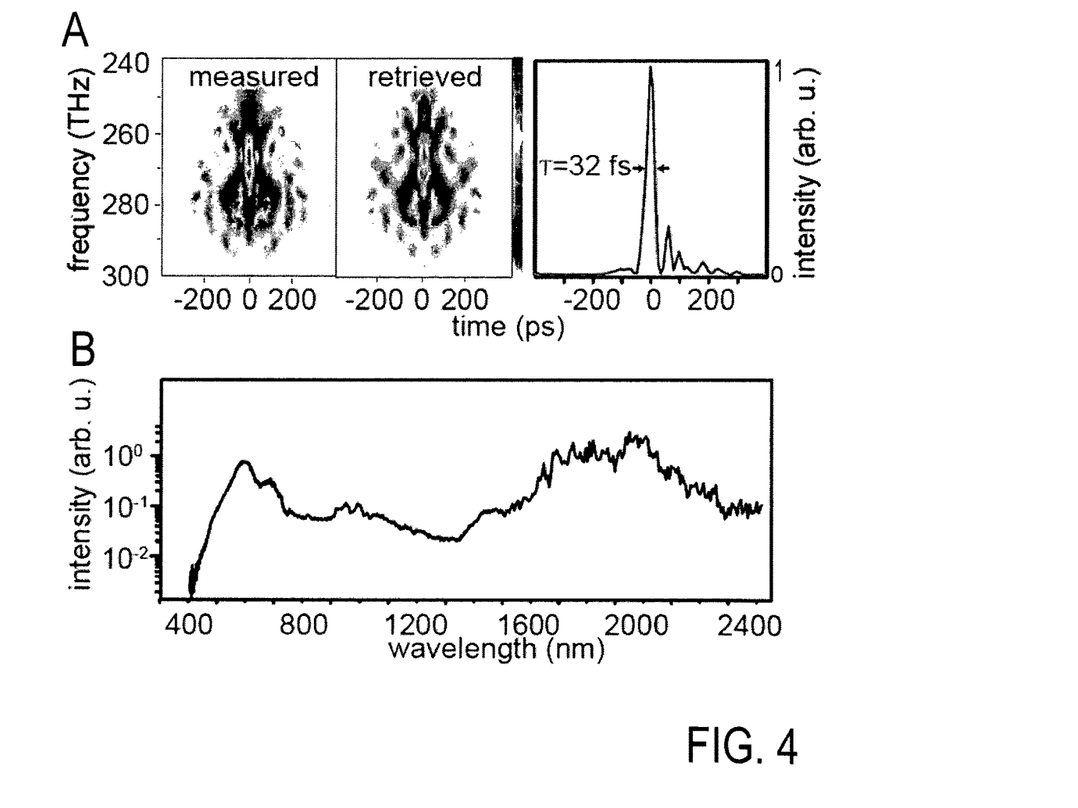

The first CEP stable ps laser pulses 7 are separated from the driving pulses 2.2, 6, by using a broadband dielectric filter 64 and temporally compressed with the first pulse compressor device 71, e. g. using bulk material, like a 20 mm uncoated SF57 and 10 mm uncoated fused silica glass plates, to 32 fs (FWHM), to first compressed fs laser 8. FIG. 4A shows an example of a measured FROG trace (left), its retrieved counterpart (middle) and the temporal intensity (right) of the first compressed fs laser pulses 8.

Afterwards the first compressed fs laser 8 were focused to the first secondary supercontinuum generation device 81, e. g. a 4 mm uncoated YAG crystal, by using an uncoated CaF2 lens 72 (f=75 mm) for filamentation to fs output pulses 1. Subsequently, the fs pulses 1 can be supplied to the application site of interest, coherently superimposed in a subsequent beam combination step and/or subjected to a further amplification (generally shown with box 200).

Grating spectrometers with silicon (NIRQuest Ocean Optics) and InGas detectors (Ocean Optics NHR) have been used to characterize the spectrum of the generated fs output pulses 1. The measured spectrum after calibration covers a range from 450 nm to wavelengths beyond 2400 nm (FIG. 4B). With frequency-resolved optical gating measurements of the generated fs output pulses 1 based on second harmonic generation (SHG-FROG) resolved spectral components up to 3000 nm. Pulse-to-pulse reproducibility and CEP-stability of the generated super-octave spectrum was verified by an f-2f interferometry measurement. The measured spectrogram showed that any CEP fluctuations were negligible.

In summary, the inventive pulse light source device and method demonstrate the direct generation of a CEP-stable pulses from a ps, e. g. Yb:YAG thin-disk amplifier. The generated SC spans from e. g. 450 nm to beyond 2400 nm and contains 4 μJ energy. The inventive concept is scalable in terms of the energy and average power and capable of generating pulses with higher average- and peak-power. For the later case the final broadening stage can be performed in a waveguide (see e. g. [17]). The inventive pulse light source device is compact with a 50*70 $cm^2$ footprint and could serve as an ideal front end for OPCPAs or field-synthesizers (as described e. g. in [18, 19]), simplifying the conventional techniques, which require a broadband seed oscillator and complex temporal synchronization between pump and seed sources ([20, 21]).

In addition, the generated 4 μJ, CEP-stable super-octave spectrum is already suitable for femtosecond time-resolved spectroscopy. The inventor's results show that the generated spectrum can be simply extended further to the far-infrared reaching 5 mm spectral range, by using the red wing of the first supercontinuum in a similar set up shown above. The advances in the Yb-doped laser technology over the last decade combined with OPCPAs present a new perspective for reaching unprecedented peak- and average-power. Furthermore, cutting-edge ideas like field synthesis and coherent combination of few-cycle pulses are about the break the barriers of few-cycle pulses to below the single-cycle regime. These advances lead to new pulse generation schemes to cover immense fragment of optical frequencies from petahertz to terahertz. The inventive pulse light source device is the essential step towards this goal.

The features of the invention disclosed in the above description, the drawings and the claims can be of significance both individually as well as in combination or sub-combination for the realisation of the invention in its various embodiments.

The invention claimed is:

1. Pulse light source device, being configured for creating fs output laser pulses having carrier-envelope-phase (CEP) stability, comprising:
   a pulse source device including a ps laser pulse source, which is arranged for creating primary ps laser pulses,
   a first beam splitting device, which is arranged for splitting the primary ps laser pulses to first ps laser pulses and second ps laser pulses,
   a pulse shortening device, which is arranged for creating first sub-ps laser pulses by shortening and spectrally broadening the first ps laser pulses using an optical nonlinear process,
   a primary supercontinuum generation device, which is arranged for creating primary fs laser pulses by subjecting the first sub-ps laser pulses to a supercontinuum generation process,
   a pulse stretcher device, which is arranged for creating stretched ps laser pulses by stretching the primary fs laser pulses, a first optical parametric chirped-pulse amplification (OP-CPA) device, which is arranged for creating first amplified ps laser pulses on the basis of the stretched ps laser pulses and the second ps laser pulses, a first phase stabilization device, which is arranged for creating first CEP stable ps laser pulses by difference frequency generation of the first amplified ps laser pulses and reference laser pulses derived from the primary ps laser pulses or from the first sub-ps laser pulses, a first pulse compressor device, which is arranged for creating first compressed fs laser pulses by compressing the first CEP stable ps laser pulses output by the first phase stabilization device, and a first secondary supercontinuum generation device, which is arranged for creating first fs output laser pulses as the fs output laser pulses to be obtained by spectrally broadening the first compressed fs laser pulses.

2. Pulse light source device according to claim 1, wherein the pulse shortening device is arranged for creating the first sub-ps laser pulses with a pulse duration which is selected such that a peak power of the first sub-ps laser pulses is below a damage threshold of the primary supercontinuum generation device.

3. Pulse light source device according to claim 2, wherein the pulse shortening device is arranged for creating the first sub-ps laser pulses with a pulse duration in a range from 15 fs to 900 fs.

4. Pulse light source device according to claim 1, wherein the pulse shortening device includes a cross-polarized wave generation unit.

5. Pulse light source device according to claim 1, wherein the primary supercontinuum generation device includes a YAG crystal or a waveguide unit.

6. Pulse light source device according to claim 1, wherein the pulse stretcher device is arranged for creating stretched ps laser pulses with a duration matched to the duration of the primary ps laser pulses.

7. Pulse light source device according to claim 1, wherein the first beam splitting device which is arranged for splitting the primary ps laser pulses further to third ps laser pulses providing the reference laser pulses, and the first phase stabilization device is arranged for creating the first CEP stable ps laser pulses by difference frequency generation of the first amplified ps laser pulses and the third ps laser pulses.

8. Pulse light source device according to claim 1, further including a second beam splitting device, which is arranged for splitting second sub-ps laser pulses from the first sub-ps laser pulses, the second sub-ps laser pulses providing the reference laser pulses, wherein the first phase stabilization device is arranged for creating the first CEP stable ps laser pulses by difference frequency generation of the first amplified ps laser pulses and the second sub-ps laser pulses.

9. Pulse light source device according to claim 1, further including a third beam splitting device, which is arranged for spectrally selective splitting the stretched ps laser pulses and providing first stretched ps laser pulses having a first spectral intensity characteristic being included in the spectral supercontinuum characteristic of the primary fs laser pulses, wherein the first OPCPA device is arranged for creating the first amplified ps laser pulses by amplifying the first stretched ps laser pulses on the basis of the second ps laser pulses.

10. Pulse light source device according to claim 9, wherein the third beam splitting device is arranged for additionally providing at least second stretched ps laser pulses having a spectral intensity characteristic being included in the spectral supercontinuum characteristic of the primary fs laser pulses and differing from the spectral intensity characteristic of the first stretched ps laser pulses, and the pulse light source device further includes at least one second OPCPA device, which is arranged for creating at least second amplified ps laser pulses by amplifying the second stretched ps laser pulses on the basis of the second ps laser pulses, at least one second phase stabilization device, which is arranged for creating at least second CEP stable ps laser pulses by difference frequency generation of the second amplified ps laser pulses and the reference laser pulses, at least one second pulse compressor device, which is arranged for creating at least second compressed fs laser pulses by compressing the second CEP stable ps laser pulses output by the at least one second phase stabilization device, and at least one second secondary supercontinuum generation device, which is arranged for creating at least second fs output pulses contributing to the fs output laser pulses to be obtained by spectrally broadening the second compressed fs laser pulses.

11. Pulse light source device according to claim 10, including three spectral channels each with one of the OPCPA devices, phase stabilization devices, pulse compressor devices and secondary supercontinuum generation devices, wherein the third beam splitting device is arranged for spectrally selective splitting the stretched ps laser pulses and providing the first, the second and third stretched ps laser pulses each with a specific spectral intensity characteristic differing from the spectral intensity characteristic of the other stretched ps laser pulses.

12. Pulse light source device according to claim 9, including a frequency shifting device, which is arranged for creating frequency shifted ps laser pulses from the second ps laser pulses and delivering the frequency shifted ps laser pulses to at least one of the first and at least one second OPCPA devices.

13. Pulse light source device according to claim 1, further including an amplification stage, which is arranged for amplifying the fs output laser pulses on the basis of a portion of the primary ps laser pulses.

14. Method of creating fs output laser pulses having carrier-envelope-phase (CEP) stability, comprising:

splitting primary ps laser pulses to first ps laser pulses and second ps laser pulses, creating first sub-ps laser pulses by shortening and spectrally broadening the first ps laser pulses using an optical nonlinear process, creating primary fs laser pulses by subjecting the first sub-ps laser pulses to a supercontinuum generation process, creating stretched ps laser pulses by stretching the primary fs laser pulses, and creating first amplified ps laser pulses on the basis of the stretched ps laser pulses and the second ps laser pulses, creating first CEP stable ps laser pulses by difference frequency generation of the first amplified ps laser pulses and reference laser pulses derived from the primary ps laser pulses or from the sub-ps laser pulses, creating first compressed fs laser pulses by compressing the first CEP stable ps laser pulses, and creating first fs output laser pulses as the fs output laser pulses to be obtained by spectrally broadening the first compressed fs laser pulses.

15. Method according to claim 14, wherein
the sub-ps laser pulses are created with a pulse duration which is selected such that a peak power of the sub-ps laser pulses is below a damage threshold of the supercontinuum generation process.

16. Method according to claim 15, wherein
the sub-ps laser pulses are created with a pulse duration in a range from 15 fs to 900 fs.

17. Method according to claim 14, wherein
the stretched ps laser pulses are created with a duration matched to the duration of the ps laser pulses.

18. Method according to claim 14, including
splitting third ps laser pulses from the primary ps laser pulses providing the reference laser pulses, and
the first CEP stable ps laser pulses are created by difference frequency generation of the first amplified ps laser pulses and the third ps laser pulses.

19. Method according to claim 14, including
splitting second sub-ps laser pulses from the first sub-ps laser pulses, the second sub-ps laser pulses providing the reference laser pulses, and
the first CEP stable ps laser pulses are created by difference frequency generation of the first amplified ps laser pulses and the second sub-ps laser pulses.

20. Method according to claim 14, further including
spectrally selective splitting the stretched ps laser pulses and providing first stretched ps laser pulses having a first spectral intensity characteristic being included in the spectral supercontinuum characteristic of the primary fs laser pulses, wherein
the first amplified ps laser pulses are created by amplifying the first stretched ps laser pulses on the basis of the second ps laser pulses.

21. Method according to claim 20, wherein
the step of spectrally selective splitting the stretched ps laser pulses additionally includes providing at least second stretched ps laser pulses having a spectral intensity characteristic being included in the spectral supercontinuum characteristic of the primary fs laser pulses and differing from the spectral intensity characteristic of the first stretched ps laser pulses, and
the method of creating fs output laser pulses further includes
creating at least second amplified ps laser pulses by amplifying the second stretched ps laser pulses on the basis of the second ps laser pulses,
creating at least second CEP stable ps laser pulses by difference frequency generation of the second amplified ps laser pulses and the reference laser pulses,
creating at least second compressed fs laser pulses by compressing the second CEP stable ps laser pulses, and
creating at least second fs output pulses contributing to the fs output laser pulses to be obtained by spectrally broadening the second compressed fs laser pulses.

22. Method according to claim 20, including
creating frequency shifted ps laser pulses from the second ps laser pulses and delivering the frequency shifted ps laser pulses for at least one of the steps of creating the first amplified ps laser pulses and creating at least the second amplified ps laser pulses.

23. Method according to claim 14, further including
coherently superimposing the fs output laser pulses.

* * * * *